J. W. WEST.
REACTIVE VOLT AMPERE METER.
APPLICATION FILED DEC. 20, 1919.

1,425,818.

Patented Aug. 15, 1922.
2 SHEETS—SHEET 1.

Inventor:
John W. West,
by Albert G. Davis
His Attorney

J. W. WEST.
REACTIVE VOLT AMPERE METER.
APPLICATION FILED DEC. 20, 1919.

1,425,818.

Patented Aug. 15, 1922.
2 SHEETS—SHEET 2.

Inventor:
John W. West,
by Albert G. Davis
His Attorney.

UNITED STATES PATENT OFFICE.

JOHN W. WEST, OF LYNN, MASSACHUSETTS, ASSIGNOR TO GENERAL ELECTRIC COMPANY, A CORPORATION OF NEW YORK.

REACTIVE VOLT-AMPERE METER.

1,425,818.  Specification of Letters Patent.  Patented Aug. 15, 1922.

Application filed December 20, 1919. Serial No. 346,301.

*To all whom it may concern:*

Be it known that I, JOHN W. WEST, a citizen of the United States, residing at Lynn, in the county of Essex, State of Massachusetts, have invented certain new and useful Improvements in Reactive Volt-Ampere Meters, of which the following is a specification.

My invention relates to a method of and apparatus for measuring the reactive volt amperes in a polyphase system. In one embodiment of my invention I show a scheme for integrating the value of the reactive volt amperes by the use of integrating watt hour meters, but my invention may be readily applied to indicating instruments as well to secure only momentary indications of the value measured. My scheme is applicable to polyphase systems in general, but in order to explain the principles involved, I select as an example a three-phase system of supply.

In my scheme, I make use of an ordinary three phase meter, consisting of two current coils and two potential coils, and also of an extra coil, which I call for convenience an external reactor. I choose this external reactor so that it has exactly the same impedance as either of the potential coils of the instrument, and connect it with the two potential coils so as to form a Y-connection. In this way, the neutral connection of the three coils coincides with the neutral point of the system. The current coils of the instrument are connected in series in any two of the lines, one current coil in each of the lines chosen, as is usually done with an ordinary watt-hour meter. The free terminal of the external reactor I connect to the third line, while the free terminals of the two potential coils are so connected to the remaining lines that the E. M. F. obtained across each of them is at right angles to the E. M. F. that there would be, were the potential coils connected in the usual manner. With a polyphase system of an odd number of phases, this may always be done, as will be more clearly brought out in the analysis below. With this scheme of connections, it can readily be proved that the reactive volt amperes are measured accurately, so long as the voltage polygon remains balanced. For the purposes of this discussion, this latter assumption is made.

Figure 1:
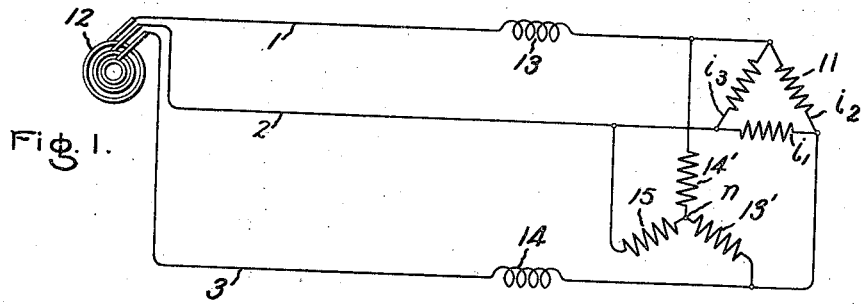
Figure 2:
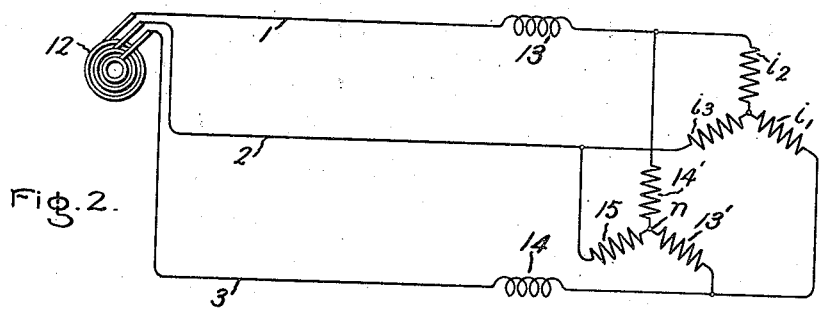
Figure 3:
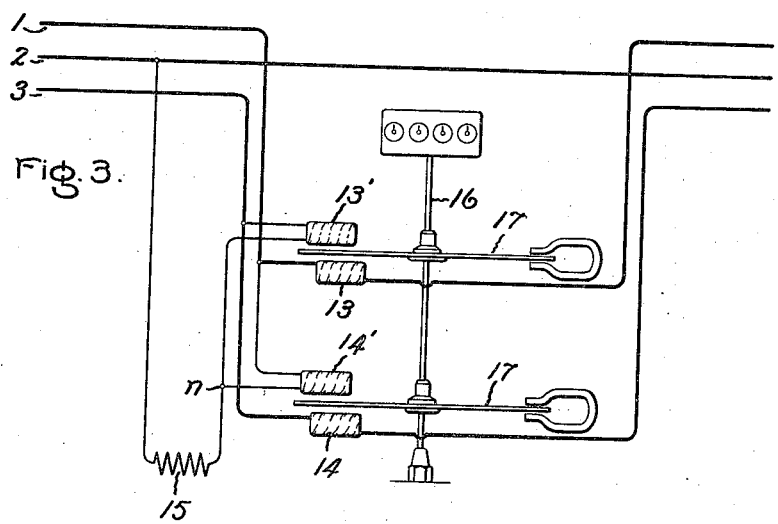
Figure 4:
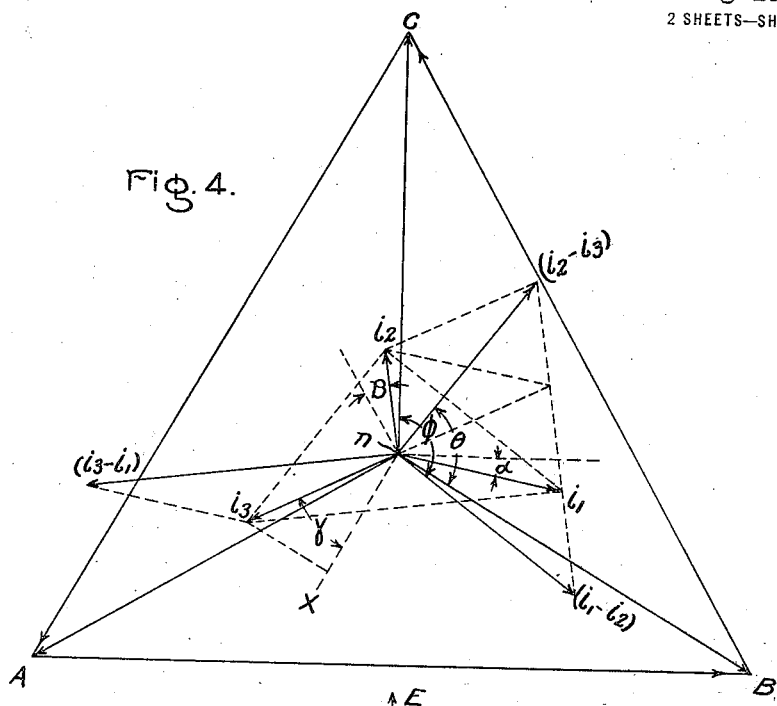
Figure 5:
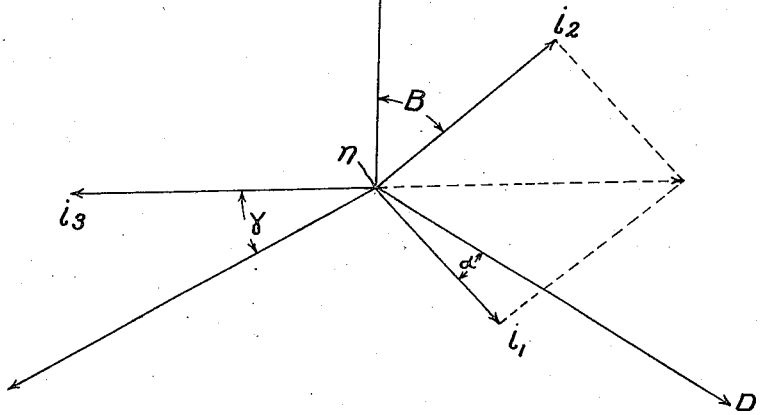

For a better understanding of my invention reference may be had to the accompanying drawings, in which Figure 1 shows my scheme of metering applied to a three phase system supplying a delta connected load; Figure 2 shows the same scheme applied to a three-phase system supplying a Y-connected load; Figure 3 shows more in detail how the various current and potential coils are connected in the polyphase instrument used, in this case shown as a meter of the induction type; Figure 4 is a vector diagram of the system shown in Figure 1; and Figure 5 is a vector diagram of the system shown in Figure 2.

Referring now more in detail to the drawings, I have shown in Fig. 1 an alternator 12 supplying a delta connected three-phase load 11, and appropriately driven by a prime mover or other source of power, not shown. The lines leading from the alternator to the load are designated by 1, 2 and 3. Current coils 13 and 14 of the three-phase instrument are connected in series respectively in lines 1 and 3, as shown. The potential coils 13' and 14' and the external reactor 15 are connected together at one end to form the neutral point $n$; the free terminal of the external reactor is connected to line 2, while the free terminal of potential coil 14' is connected to line 1, and of potential coil 13' to line 3. The rotating element 16 carrying armature 17 of the watthour meter will be rotated proportionately to the wattless component of the volt amperes. Although in Fig. 3 an induction type watthour meter is diagrammatically illustrated, any other kind of instrument may be used to accomplish the same results.

Attention is now directed to Fig. 4 showing the vector relations of the currents and E. M. F.'s in the various instrument coils. The E. M. F. triangle ABC shows the three E. M. F.'s AB, BC, and CA, supplied to the three phases of the load. This triangle is an equilateral one. The neutral point $n$ of the system is chosen as the origin of many of our vectors, for the sake of symmetry. The vectors $i_1$, $i_2$, and $i_3$ denote the currents in the three phases of the delta connected load. The reference characters $i_1$, $i_2$ and $i_3$ are added to the load phase in Fig. 1 to show how the two figures are related. In any polyphase system, the vector sum of the currents must equal zero; in the present instance $i_1$ and $i_2$ were arbitrarily chosen, then $i_3$ was made equal in length to the vector sum of $i_1$ and $i_2$, but in the opposite direction. The current in line 3 is given by the vector difference of $i_1$ and $i_2$, and this vector difference is shown by the vector $(i_1-i_2)$ in Fig. 4. In the same way the current in line 1 is given by the vector $(i_2-i_3)$, and the current in line 2 is given by the vector $(i_3-i_1)$. The phase displacements of the three load currents $i_1$, $i_2$, and $i_3$ are represented respectively by the angles $\alpha$, $\beta$, and $\gamma$. The total reactive volt amperes of the entire system are, therefore, $$E(i_1 \sin \alpha + i_2 \sin \beta + i_3 \sin \gamma), \quad (1)$$

where E is the line voltage, and $i_1$, $i_2$ and $i_3$ here represent the magnitude of the current vectors.

The current in the current coil 14 has a magnitude equal to that of vector $(i_1-i_2)$, and makes an angle of $\varphi$ with the E. M. F. across the corresponding potential coil 14', which E. M. F. is designated by the vector $n$ C in Fig. 4. The magnitude of this E. M. F. vector is $\frac{E}{\sqrt{3}}$. Therefore the torque produced by the pair of coils 14 and 14' is proportional to $$(i_1-i_2)\frac{E}{\sqrt{3}} \cos \varphi.$$

The current in the current coil 13 has a magnitude equal to that of vector $(i_2-i_3)$, and makes an angle of $\theta$ with E. M. F. across the corresponding potential coil 13', which E. M. F. is designated by the vector $n$ B in Fig. 4. The magnitude of this E. M. F. vector is $\frac{E}{\sqrt{3}}$. Therefore the torque produced by the pair of coils 13 and 13' is proportional to $$(i_2-i_3)\frac{E}{\sqrt{3}} \cos \theta.$$

The total torque due to the two pairs of coils may then be represented by the expression:

$$(i_1-i_2)\frac{E}{\sqrt{3}} \cos \varphi - (i_2-i_3)\frac{E}{\sqrt{3}} \cos \theta \quad (2)$$

The coils are so connected as to produce opposing torques, as shown by the negative sign between the two expressions, so that when the load is non-inductive there may be no movement of the meter.

In equation (1) the term $i_3 \sin \gamma$ may be readily expressed in terms of the other two phase currents $i_1$ and $i_2$, from the general relation that the vector sum of all three must vanish. Therefore the component $i_3 \sin \gamma$ is numerically equal to, but opposite in sign, to the sum of the components of $i_1$ and $i_2$ which are perpendicular to the line $n$ X. Therefore, $$i_3 \sin \gamma = i_1 \cos (30°-\alpha) - i_2 \cos (30°+\beta)$$

from which we may finally obtain $$i_3 \sin \gamma = \frac{\sqrt{3}}{2} i_1 \cos \alpha + \frac{1}{2} i_1 \sin \alpha - \frac{\sqrt{3}}{2} i_2 \cos \beta + \frac{1}{2} i_2 \sin \beta \quad (3)$$

By substituting this value of $i_3 \sin \gamma$ in equation (1) we obtain:

$$\text{Wattless component} = E\left(\frac{3}{2} i_1 \sin \alpha + \frac{\sqrt{3}}{2} i_1 \cos \alpha + \frac{3}{2} i_2 \sin \beta - \frac{\sqrt{3}}{2} i_2 \cos \beta\right) \quad (4)$$

Our next step is to show that equation (2) reduces to equation (4), and if we succeed in so doing, the proposition is solved.

In order to get $(i_1-i_2)\frac{E}{\sqrt{3}} \cos \varphi$ and $(i_2-i_3)\frac{E}{\sqrt{3}} \cos \theta$ in terms of $i_1$, $i_2$, $\alpha$ and $\beta$, we resolve $(i_1-i_2)$ along $n$ C, and $(i_2-i_3)$ along $n$ B. The component along $n$ C, of $(i_1-i_2)$ is one of the quantities we want, since it is of course equal to $(i_1-i_2) \cos \varphi$. But this component is equal to the component of $i_1$ along $n$ C minus the negative component of $i_2$ along $n$ C, or $$(i_1-i_2)(-\cos \phi) = i_1(-\sin \alpha) - i_2 \cos(30°-\beta)$$

$$\text{or } (i_1-i_2) \cos \phi = i_1 \sin \alpha + \frac{1}{2} i_2 \sin \beta + \frac{\sqrt{3}}{2} i_2 \cos \beta. \quad (5)$$

We may get, in the same way, a value for $(i_2-i_3) \cos \theta$. To do this, a little simplification may be advisable. It is to be noted that the component along $n$ B of $(i_2-i_3)$ is equal to the component along $n$ B of $i_2$ minus the component along $n$ B of $i_3$. But this latter component is the sum of the components along $n$ B of $i_1$ and $i_2$, due to the relation between the three vectors $i_1$, $i_2$ and $i_3$, that their sum must vanish. Therefore, $(i_2-i_3) \cos \theta =$ twice the component of $i_2$ plus the negative component of $i_1$, or $2i_2 \cos(30°+\beta) + [-i_1 \cos(30°-\alpha)]$.

$$\therefore (i_2-i_3) \cos \theta = \sqrt{3}\, i_2 \cos \beta - i_2 \sin \beta - \frac{\sqrt{3}}{2} i_1 \cos \alpha - \frac{1}{2} i_1 \sin \alpha. \quad (6)$$

We can now substitute the values obtained in equations (5) and (6) in equation (2), and we shall have, the quantity measured by the meter=

$$\text{Total torque} = \frac{E}{\sqrt{3}} \left[ \left( i_1 \sin \alpha + \frac{1}{2} i_2 \sin \beta + \frac{\sqrt{3}}{2} i_2 \cos \beta \right) - \left( \sqrt{3} i_2 \cos \beta - i_2 \sin \beta - \frac{\sqrt{3}}{2} i_1 \cos \alpha - \frac{1}{2} i_1 \sin \alpha \right) \right]$$

$$= \frac{E}{\sqrt{3}} \left( \frac{3}{2} i_1 \sin \alpha + \frac{\sqrt{3}}{2} i_1 \cos \alpha + \frac{3}{2} i_2 \sin \beta - \frac{\sqrt{3}}{2} i_2 \cos \beta \right) \quad (7)$$

This last agrees with equation (4) except for a proportionality factor $\sqrt{3}$, so that by a proper calibration of the scale it is possible to make the instrument read directly.

In the analysis given, the time factor was not introduced, but it might be, leaving the steps corresponding to those worked out above precisely the same except for the introduction of that factor.

The foregoing analysis proves the proposition for a delta connected load; for a Y-connected load the treatment is even simpler and the same results may be obtained. The line currents in this case are equal to the load currents, and the E. M. F. across each phase of the load is the same as the E. M. F. across the potential coils. The diagram of connections is shown in Fig. 2, and the corresponding vector diagram in Fig. 5.

The E. M. F. vectors of the potential coils 13′ and 14′ are shown by the vectors $n$ D and $n$ E respectively. The three load currents, as before, are shown by $i_1$, $i_2$, and $i_3$ and the phase displacements of the currents by $\alpha$, $\beta$ and $\gamma$.

The reactive volt amperes in the three phases of the load are given by an expression similar to that of equation (4), except that the E. M. F. across each load is now only $\frac{E}{\sqrt{3}}$. Therefore the reactive volt amperes are equal to $$\frac{E}{\sqrt{3}} \left( \frac{3}{2} i_1 \sin \alpha + \frac{\sqrt{3}}{2} i_1 \cos \alpha + \frac{3}{2} i_2 \sin \beta - \frac{\sqrt{3}}{2} i_2 \cos \beta \right) \quad (8)$$

The current flowing in current coil 14 is $i_1$, while that in coil 13 is $i_2$. Therefore the actual measurement made by the meter is given by $$\frac{E}{\sqrt{3}} i_2 \cos (120° - \beta) - \frac{E}{\sqrt{3}} i_1 \cos (120° - \alpha).$$

This expression finally reduces to $$\frac{E}{\sqrt{3}} \left( -\frac{1}{2} i_2 \cos \beta + \frac{\sqrt{3}}{2} i_2 \sin \beta + \frac{1}{2} i_1 \cos \alpha + \frac{\sqrt{3}}{2} i_1 \sin \alpha \right).$$

If we multiply this through by a proportionality factor $\sqrt{3}$ it becomes $$\frac{E}{\sqrt{3}} \left( \frac{3}{2} i_1 \sin \alpha + \frac{\sqrt{3}}{2} i_1 \cos \alpha + \frac{3}{2} i_2 \sin \beta - \frac{\sqrt{3}}{2} i_2 \cos \beta \right),$$

which is identical with the expression (8) obtained for the actual value of the wattless components.

The two cases proven above analytically are taken merely by way of example; it might be similarly shown that my method holds true for any polyphase system of an odd number of phases. It is merely necessary to take care that each current coil has a potential coil associated therewith having an E. M. F. perpendicular in direction to that of the potential coil used for measuring the power component. With an artificial neutral, created as I have shown, it is always possible to obtain such a relationship.

What I claim as new and desire to secure by Letters Patent of the United States, is:—

1. Means for measuring the reactive volt amperes in an $n$ phase system having an odd number of phases, said means comprising $(n-1)$ current coils, a corresponding number of potential coils cooperating therewith, a single reactor star connected with said potential coils to the lines to form a star connection with $n$ branches, the outer end of the reactor being connected to the line having no current coil and the outer ends of the potential coils being connected to the lines having current coils, whereby E. M. F.'s are obtained displaced 90° from those across the lines, and armatures actuated by the current and voltage coils.

2. Means for measuring the reactive volt amperes consumed in a three phase system comprising two current coils and two potential coils cooperating therewith, an external coil connected in Y with the two potential coils across the lines of the system, the free end of the external coil being connected to the line having no current coil therein, and each of the free ends of the two potential coils being connected to the line other than that in which the corresponding current coil is connected, and means for utilizing the torques produced by the current and potential coils for performing an indicating function.

3. A meter for measuring the reactive volt amperes in a three phase system, said meter comprising two current coils, two potential coils cooperating one with each current coil, a reactor connected between said potential coils and the line having no current coil for altering the normal phase relations between the magneto-motive forces of each current coil and its associated potential coil, and means for utilizing the torques produced by the current and potential coils for performing an indicating function.

4. Means for measuring the reactive volt amperes consumed in an $n$ phase system having an odd number of phases, said means comprising $(n-1)$ current coils and $(n-1)$ potential coils cooperating therewith, an external coil star connected with the $(n-1)$ potential coils across the lines of the system, the free end of the external coil being connected to the line having no current coil therein, and each of the free ends of the $(n-1)$ potential coils being connected to a line other than that in which the corresponding current coil is connected, and means for utilizing the torques produced by the current and potential coils for performing an indicating function.

In witness whereof, I have hereunto set my hand this 17th day of December 1919.

JOHN W. WEST.